United States Patent [19]

Mizuta

[11] Patent Number: 4,839,953

[45] Date of Patent: Jun. 20, 1989

[54] MAGNETIC DISK CARTRIDGE ASSEMBLY SYSTEM

[75] Inventor: Akira Mizuta, Kanagawa, Japan

[73] Assignee: Fuji Photo Film Co., Ltd., Kanagawa, Japan

[21] Appl. No.: 140,270

[22] Filed: Dec. 31, 1987

[30] Foreign Application Priority Data

Jan. 9, 1987 [JP] Japan .................................. 62-2899

[51] Int. Cl.$^4$ .................... B23P 19/04; B65H 3/00; G11B 5/82; B65B 69/00
[52] U.S. Cl. .................................. 29/225; 254/10.5; 360/135; 414/222; 221/36; 221/41
[58] Field of Search ................. 29/225, 226, 227, 228, 29/229, 230, 173; 267/155, 182; 16/71; 254/10.5; 360/135; 414/22; 221/36, 41

Primary Examiner—Bruce Y. Arnold
Assistant Examiner—Ronald M. Kachmarik
Attorney, Agent, or Firm—Sughrue, Mion, Zinn, Macpeak & Seas

[57] ABSTRACT

A magnetic disk cartridge is provided with a dust shutter which is slidably mounted on a casing to open and close a magnetic head access opening in the casing. A V-shaped shutter spring for urging the dust shutter toward the closing position is inserted into the casing through a spring insertion opening. A magnetic disk cartridge assembly system includes a guide member which has a guide groove for holding the shutter spring in a compressed state and is adapted to bring a first end of the guide groove in close opposition to the spring insertion opening of the casing, the width of the guide groove being not larger than that of the spring insertion opening at least at the first end, and a pusher which is adapted to move the spring along the guide groove and to insert it into the spring insertion opening through the first end of the guide groove.

8 Claims, 5 Drawing Sheets

MAGNETIC DISK CARTRIDGE ASSEMBLY SYSTEM

BACKGROUND OF THE INVENTION

1. Field of the Invention

This invention relates to a magnetic disk cartridge assembly system, and more particularly to a system for incorporating in a casing of a magnetic disk cartridge a substantially V-shaped shutter spring which urges a dust shutter in a predetermined direction with respect to the casing.

2. Description of the Prior Art

As shown in FIGS. 5A and 5B, a magnetic disk cartridge 1 is provided with a dust shutter 3 which is slidably mounted on the outer surface of a casing 2 for accommodating therein a magnetic disk, and opens and closes the magnetic head receiving opening 4 in the casing 2. A shutter spring 5 for urging the dust shutter 3 toward the closing position in order to ensure that the opening 4 closes when the magnetic disk cartridge 1 is not in use is incorporated in the casing 2. The shutter spring 5 is generally a torsional coil spring and is inserted into the casing 2 through a spring insertion opening 6 to the position shown in FIG. 5A in which it abuts against an engaging portion 7 on the casing 2 at one end and against an engaging portion 8 on the shutter 3 at the other end under its own resiliency. Since the spring insertion opening 6 is smaller in width than the distance between the ends of the shutter spring 5 when it is in the illustrated position in order to prevent it from falling off the casing 2, the shutter spring must be compressed once to clear the narrow opening 6.

Conventionally, the shutter spring 5 has been incorporated in the casing 2 by first, as shown in FIG. 6, bringing one end 5b of the spring 5 into engagement with the engaging portion 7 on the casing 2 and then pushing the spring 5 in the direction of the arrow, or by, as shown in FIG. 7, inserting the coil portion 5a of the shutter spring 5 into the opening 6 and pushing the spring 5 in the direction of the arrow.

However, in either method, the shutter spring 5 is pressed against the peripheral edge of the opening 6 to be compressed when the spring 5 is pushed in the direction of the arrow, and accordingly the L-shaped ends 5b and 5c of the spring 5 are apt to become engaged with the peripheral edge of the opening 6, causing problems in the incorporation of the shutter spring 5. This will cause failure in the incorporation of the shutter spring 5 when the incorporation of the shutter spring 5 is automated. Such a problem will also be encountered when a V-shaped spring other than a torsional coil spring is used as the shutter spring.

SUMMARY OF THE INVENTION

In view of the foregoing observations and description, the primary object of the present invention is to provide a magnetic disk cartridge assembly system which can incorporate a V-shaped shutter spring in the casing securely and with ease.

The magnetic disk cartridge assembly system in accordance with the present invention comprises a guide member which has a guide groove for holding the shutter spring in a compressed state and is adapted to bring a first end of the guide groove in close opposition to the spring insertion opening of the casing, the width of the guide groove being not larger than that of the spring insertion opening at least at the first end, and a movable insertion means which is adapted to move the spring along the guide groove and to insert it into the spring insertion opening through the first end of the guide groove.

The guide member may be either movable or stationary so long as it is located in or can be moved to a position in which said first end of the guide groove is in close opposition to the spring insertion opening of the casing so that the spring cannot project between the casing and the guide member.

DESCRIPTION OF THE PREFERRED EMBODIMENT

Figure 1:
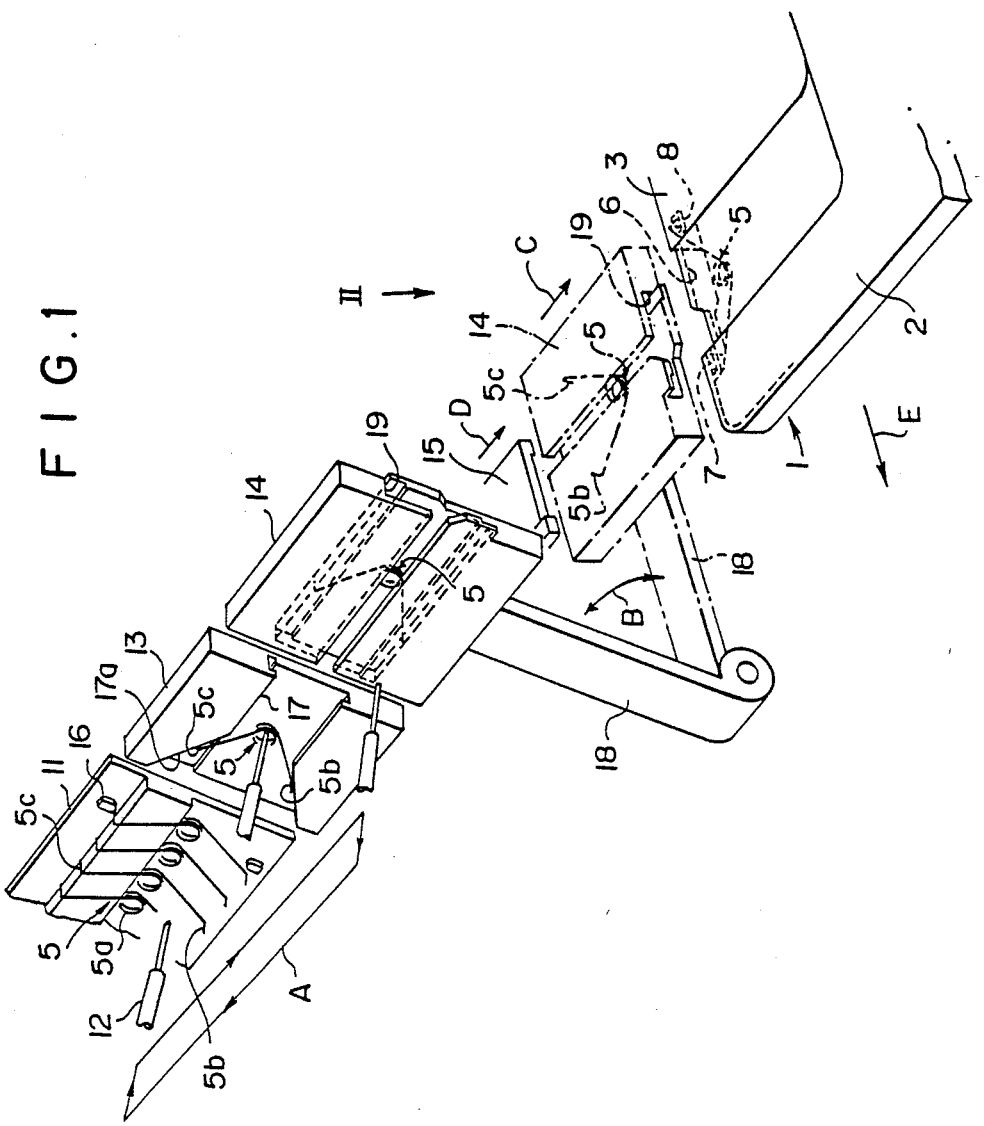
FIG. 1 is a perspective view showing a magnetic disk cartridge assembly system in accordance with an embodiment of the present invention.

In FIG. 1, a magnetic disk cartridge assembly system in accordance with an embodiment of the present invention includes a vibrating feeder 11, an escape pin 12, a compressing jig 13, a guide member 14 and a pusher 15.

The vibrating feeder 11 finely vibrates up and down and holds a plurality of torsional coil springs 5 contiguously arranged in a row with the one at the head of the row being retained by stops 16.

The escape pin 12 is arranged to be moved as shown by arrow A and is inserted into the coil portion 5a of the torsional coil spring 5 at the head of the row and forces it into the guide member 14 through the compressing jig 13.

The compressing jig 13 has a guide groove 17 having a tapered inlet portion 17a which is tapered in the direction of movement of the spring 5 and the coil spring 5 is gradually compressed as it is passed through the inlet portion 17a so that the distance between the ends 5b and 5c thereof is shortened. The ends 5b and 5c of the spring 5 are bent in opposite directions, each into an L-shape, and the cross-sectional shape of the guide groove 17 is stepped so as to accommodate the L-shaped ends 5b and 5c without the coil portion 5a of the spring 5 coming away from the bottom of the guide groove 17. The compressing jig 13 is fixed in the illustrated position.

The guide member 14 is supported by an arm 18 which is mounted for pivotal motion as shown by arrow B between an upper position in which the guide member 14 is aligned with the compressing jig 13 and a lower position in which the guide member 14 is aligned with a casing 2 for a magnetic disk cartridge 1. The guide member 14 has a guide groove 19 the width of which is uniform over the entire length thereof and slightly smaller than the width of the spring insertion opening 6 (FIG. 4) of the casing 2 and slightly larger than the width of the outlet side portion of the guide groove 17 of the compressing jig 13. This arrangement permits the guide member 14 to smoothly receive the coil spring 5 from the compressing jig 13 even if the guide member 14 is not precisely aligned with the compressing jig 13 and to smoothly deliver the same to the casing 2 (as will be described later) even if the guide member 14 is not precisely aligned with the casing 2.

When the escape pin 12 pushes the spring 5 along the guide groove 19 of the guide member 14 and the spring 5 reaches the position shown by the dotted line in FIG. 1, the arm 18 is pivoted to the lower position to bring the guide member 14 into alignment with the casing 2. That is, the delivery side end of the guide groove 19 of the guide member 14 is opposed to the spring insertion opening 6 of the casing 2. The guide member 14 is movable relative to the arm 18 in the direction of arrow C when the arm 18 is in the lower position, and after the arm 18 is pivoted to the lower position, the guide member 14 is moved by a driving means (not shown) in the direction of arrow C to a spring delivering position in which an end of the guide groove 19 thereof is closely opposed to the spring insertion opening 6 of the casing 2.

The pusher 15 is movable in the direction of arrow D, which is parallel to the direction of arrow C. In response to the movement of the guide member 14 to the spring delivering position, the pusher 15 is moved in the direction of arrow D into the guide groove 19 from the end remote from the casing 2 to push the ends 5b and 5c of the spring 5. When the spring 5 is ejected from the end of the guide groove 19 into the spring insertion opening 6, the ends 6b and 5c of the spring 5 move away from each other under the resiliency of the spring 5 and resiliently abut against the engaging portion 7 on the casing 2 and the engaging portion 8 on the shutter 8, respectively, to be held there under the resiliency of the spring 5.

When the spring 5 has been thus incorporated in the casing 2, the casing 2 provided with the spring 5 is fed in the direction of arrow E and another casing 2 is fed to the position shown in FIG. 1. In this manner, casings 2 are provided with a spring 5 one after another.

Figure 2A:
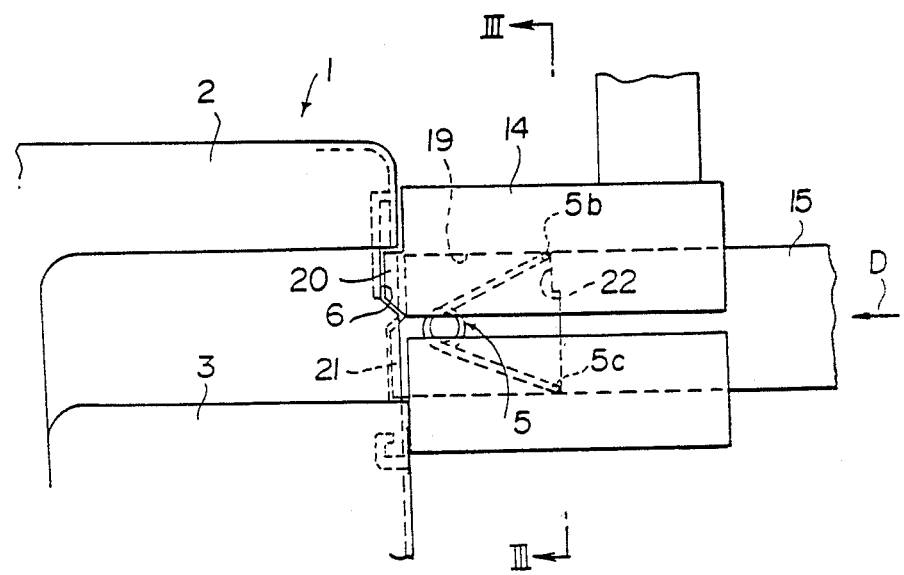
FIGS. 2A and 2B are views as seen from the direction indicated by the arrow II in FIG. 1 for illustrating the operation of the system.
Figure 2B:
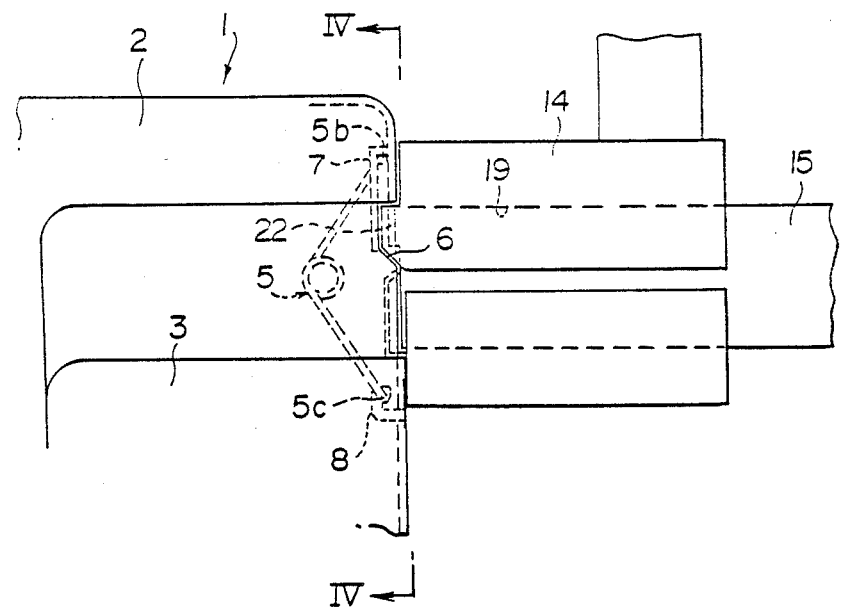

FIG. 2A shows the condition in which the spring 5 is pushed by the pusher 15 to be moved along the guide groove 19 of the guide member 14, and FIG. 2B shows the condition immediately after the spring 5 is inserted into the opening 6 of the casing 2 to be incorporated therein.

As shown in FIG. 2A, the guide member 14 is provided, at the end of the guide grove 19, with projecting portions 20 and 21 which conform to the profile of the edge of the casing 2 around the spring insertion opening 6. By virtue of these projecting portions 20 and 21, the space between the guide member 14 and the casing 2 when the guide member 14 is in the spring delivering position can be smaller than the wire diameter of the spring 5, whereby the spring 5 can be smoothly inserted into the spring insertion opening 6 without any possibility of the ends 5b and 5c projecting into the space between the guide member 14 and the casing 2 and being interfered with by the edge of the casing 2.

As can be seen from FIGS. 2A and 2B, the pusher 15 is provided with a projection 22 on the side adapted to abut against the end 5b of the spring 5. This is for compensating for the difference between the wall thicknesses of the casing 2 and the shutter 3 and for ensuring that the ends 5b and 5c of the spring 5 begin to move away from each other simultaneously. That is, the wall thickness of the casing 2 which is made of resin is larger than the wall thickness of the shutter 3 which is made of metal, and accordingly, if the pushing end of the pusher 15 is flat, the end 5c which is to be slid on the inner side of the shutter 3 to be engaged with the engaging portion 8 thereon is released to move away from the other end 5b before release of the end 5b which is to be slid on the inner side of the casing 2 to be engaged with the engaging portion 7 thereon. This can cause failure of the ends 5b and 5c to be engaged with the corresponding engaging portions 7 and 8.

Figure 3:
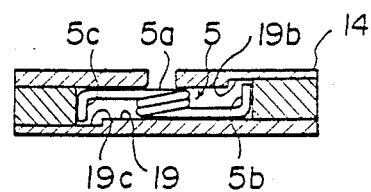
FIG. 3 is a cross-sectional view taken along line III—III in FIG. 2.

FIG. 3 shows the torsional coil spring 5 in the compressed state in the guide groove 19 of the guide member 14. As can be understood from FIG. 3, since the ends 5b and 5c of the spring 5 are pressed against the side walls of the guide groove 19 of the guide member 14 under the resiliency of the spring 5, and the coil portion 5a of the spring 5 is sandwiched between the upper and lower walls of the guide groove 19, the spring 5 can be moved along the guide groove 19 while maintaining the illustrated position. Further, since the upper and lower wall of the guide groove 19 are respectively provided with recesses 19b and 19c for receiving the ends 5b and 5c of the spring 5, the spring 5 can be smoothly moved along the guide groove 19 without interference of the ends 5b and 5c with the guide member 14.

Figure 4:
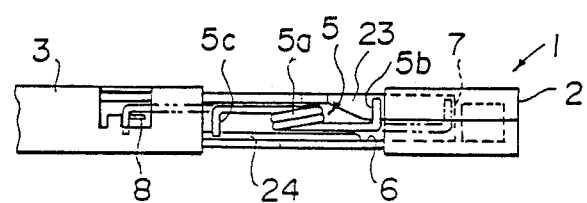
FIG. 4 is a cross-sectional view taken along line IV—IV in FIG. 2B, FIGS. 5A and 5B are respectively a plan view and a side view of a common magnetic disk cartridge.
Figure 5:
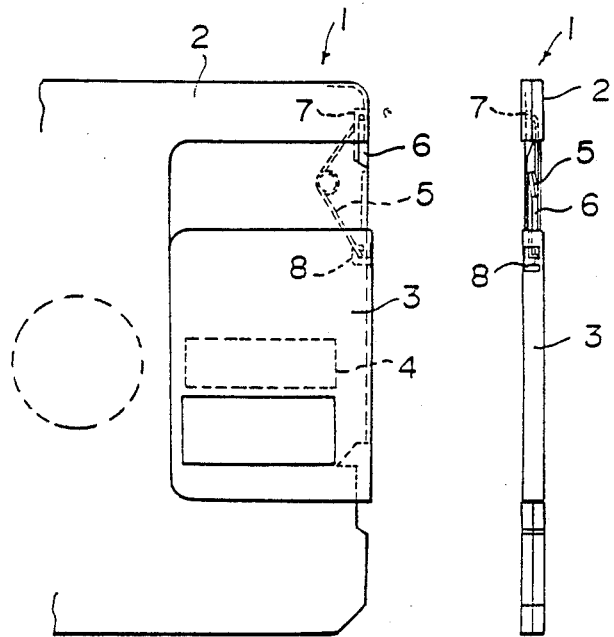
Figure 6:
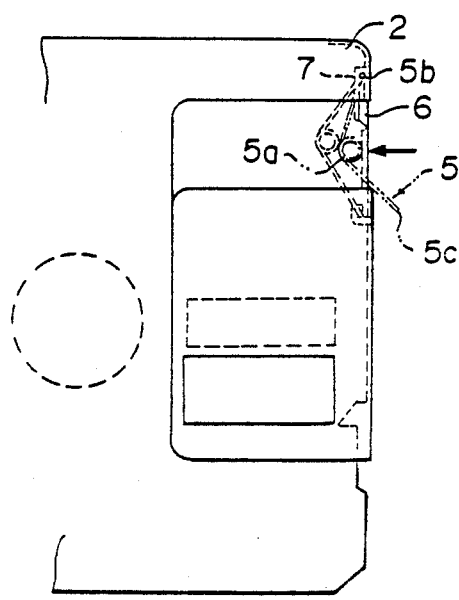
FIGS. 6 and 7 are views for illustrating conventional methods of assembling the magnetic disk cartridge.
Figure 7:
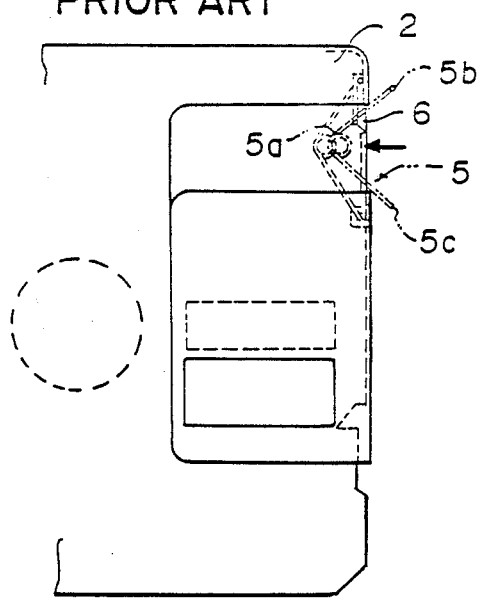

As described above, the spring 5 is released from the constraint of the guide groove 19 when it is inserted into the spring insertion opening 6 and is held in a predetermined position in the casing 2 as shown by the chained line in FIG. 4. When the spring 5 is released from the constraint of the guide groove 19, the ends 5b and 5c are moved away from each other under the guidance of a stop 23 and a guide rail 24 for guiding the shutter 3 which are formed on the casing 2. Since the guide rail 24 is in he form of a protrusion projecting upward from the bottom (as seen in FIG. 4) of the casing 2 and extending in the sliding direction of the shutter 3, there is produced an up-and-down play between the upper and lower walls of the casing 2 and the ends 5b and 5c of the spring 5 when the coil portion 5a clears the guide rail 24 and is located between the guide rail 24 and the stop 23. However, in this embodiment, this does not cause any problem in the incorporation of the spring 5 since the pusher 15 is arranged to push the ends 5b and 5c until the instant that the ends 5b and 5c are released and begin to move away from each other.

When the ends 5b and 5c are released from the constraint of the guide groove 19 and respectively abut against the engaging portion 7 on the casing 2 and the engaging portion 8 on the shutter 3, the spring 5 resiliently urges the shutter 3 away from the engaging portion 7 on the casing 2 to hold the shutter 3 in the closed position.

As described above, in accordance with this embodiment, the spring can be securely incorporated in the casing since the spring is incorporated in the casing in a compressed state. Further, when incorporating the spring in the casing, the spring is forced into the casing by the ends of the spring being pushed by the pusher while the spring is in a compressed state in the guide groove, and accordingly incorporation of the spring can be effected more surely and more easily. Moreover, since the springs are taken out from the vibrating feeder one after another by the escape pin and are then compressed by the compressing jig before being inserted into the guide groove of the guide member, the spring can be easily fed to the guide member. Thus, in accordance with this embodiment, the spring can be quickly incorporated in the casing by an automated system.

I claim:

1. A magnetic disk cartridge assembly system for assembling a magnetic disk cartridge having a casing for accommodating therein a magnetic disk, a shutter which is slidably mounted on the outer surface of the casing, and a substantially V-shaped shutter spring which urges the shutter toward a predetermined direction and is inserted into the casing through a spring insertion opening to abut against an engaging portion on the casing at one end and against an engaging portion on the shutter at the other end under its own resiliency, comprising a guide member which has a guide groove for holding the shutter spring in a compressed state and is adapted to bring a first end of the guide groove in close opposition to the spring insertion opening of the casing, the width of the guide groove being not larger than that of the spring insertion opening at least at the first end, and a movable insertion means which is adapted to move the spring along the guide groove and to insert it into the spring insertion opening through the first end of the guide groove.

2. A magnetic disk cartridge assembly system as defined in claim 1 in which said shutter spring ends are bent in opposite directions substantially perpendicular to a plane thereof that includes the substantially V-shaped shutter spring body portion, and said guide groove has a cross-sectional shape conforming to a profile of the shutter spring.

3. A magnetic disk cartridge assembly as defined in claim 1 in which said movable insertion means comprises a pusher which is inserted into the guide groove from a second end of the guide groove opposite to the first end and pushes the ends of the shutter spring.

4. A magnetic disk cartridge assembly system as defined in claim 3 in which a front end of the pusher at which the pusher abuts against the ends of the shutter spring is stepped so that the ends of the shutter spring in the compressed state begin to move away from each other simultaneously in consideration of a difference in wall thickness between the sides of the spring insertion opening of the casing.

5. A magnetic disk cartridge assembly system as defined in claim 1 in which said V-shaped shutter spring is a torsional coil spring having a coil portion and a pair of resilient arms.

6. A magnetic disk cartridge assembly system as defined in claim 5 in which said shutter spring is fed to the guide member through a second end of the guide groove opposite to the first end from a vibrating feeder by way of a compressing jig.

7. A magnetic disk cartridge assembly system as defined in claim 6 in which said shutter spring is fed to the guide member by an escape pin which is inserted into the coil portion of the shutter spring and pushes the coil portion toward the guide member.

8. A magnetic disk cartridge assembly system as defined in claim 7 in which said compressing jig is provided with a guide groove having a tapered inlet portion and a parallel outlet portion, an inlet end portion of the tapered inlet portion having a width sufficiently larger than the distance between the ends of the shutter spring when it is released, and an outlet end of the outlet portion being slightly smaller in width than the second end of the guide groove of the guide member.

* * * * *